(12) United States Patent  
Evans

(10) Patent No.: US 8,254,539 B2
(45) Date of Patent: Aug. 28, 2012

(54) CONTROLLING A TEST LOAD THROTTLE

(75) Inventor: Jeffrey R. Evans, Lovettsville, VA (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 1284 days.

(21) Appl. No.: 11/615,110

(22) Filed: Dec. 22, 2006

(65) Prior Publication Data

US 2008/0151752 A1   Jun. 26, 2008

(51) Int. Cl.
*H04M 15/00* (2006.01)

(52) U.S. Cl. ......... 379/112.01; 379/112.04; 379/112.06; 379/10.01; 379/10.02

(58) Field of Classification Search ............... 379/27.01, 379/241, 27.04, 111, 112.05, 112.06, 112.1, 379/10.01–10.03; 370/235
See application file for complete search history.

(56) References Cited

U.S. PATENT DOCUMENTS

| 5,680,448 | A  | * | 10/1997 | Becker ............... 379/221.07 |
| 6,178,235 | B1 | * | 1/2001  | Petersen et al. ............ 379/134 |
| 6,529,499 | B1 | * | 3/2003  | Doshi et al. ................. 370/352 |
| 6,529,583 | B2 | * | 3/2003  | Creamer et al. .......... 379/10.03 |
| 6,721,686 | B2 | * | 4/2004  | Malmskog et al. ........... 702/186 |
| 6,823,051 | B1 | * | 11/2004 | Thomas et al. .......... 379/112.01 |
| 7,174,002 | B1 | * | 2/2007  | Burns .................... 379/10.02 |
| 7,508,920 | B1 | * | 3/2009  | Yu et al. .................. 379/9.02 |
| 7,738,379 | B1 | * | 6/2010  | Bakshi ..................... 370/235 |
| 2002/0176543 | A1 | * | 11/2002 | Creamer et al. ........... 379/10.02 |
| 2004/0110507 | A1 | * | 6/2004  | Ramakrishnan et al. ..... 455/445 |
| 2006/0233101 | A1 | * | 10/2006 | Luft et al. .................. 370/229 |
| 2006/0274660 | A1 | * | 12/2006 | Da Palma et al. ............ 370/241 |
| 2008/0037430 | A1 | * | 2/2008  | Wah et al. .................. 370/241 |

* cited by examiner

*Primary Examiner* — Ahmad Matar
*Assistant Examiner* — Oleg Asanbayev

(57) ABSTRACT

A device includes a traffic load profile containing information for regulating rates of routing calls and a controller. The controller may be configured to access the traffic load profile, obtain network calls from a traffic load producer, and route the network calls to a system under test based on the traffic load profile.

19 Claims, 9 Drawing Sheets

CONTROLLING A TEST LOAD THROTTLE

BACKGROUND INFORMATION

Many problems that are found in a production system may not occur until the system has been operating for a prolonged period of time. For example, when specific combinations of services are rendered to clients, memory leaks, filling of file systems with log files, and/or degradation of overall system performance may not become apparent until applications have been in use for days, weeks, months or years.

DETAILED DESCRIPTION OF PREFERRED EMBODIMENTS

The following detailed description refers to the accompanying drawings. The same reference numbers in different drawings may identify the same or similar elements.

Although implementations are described below in the context of SIP and an Internet Protocol (IP)-based network, other communication protocols (e.g., Common Channel Signaling System Number 7 (SS7), International Telecommunication Union (ITU) H.323,) and/or types of transport networks (e.g., public switched network (PSN), asynchronous transfer mode (ATM), frame relay, etc.) may be used. Both the ITU H.323 standard and the IETF's SIP are examples of protocols that may be used for establishing a communications session among terminals connected to a network. Although SIP-type calls are shown for convenience, any type of protocol or a mixture of such protocols may be applied in various parts of the overall system.

Many problems in a network may be detected by feeding the network with different test traffic loads for prolonged periods of time. In the following implementations, a throttle controller may simulate a specified profile of network traffic load over any duration. The throttle controller may relay network calls from a traffic producer to other elements of the network based on the profile of network traffic. The profile may indicate the network traffic load for different types of network services and for Time of Day (TOD), Day of Week (DOW), Day of Month (DOM), and Day of Year (DOY).

Figure 1:
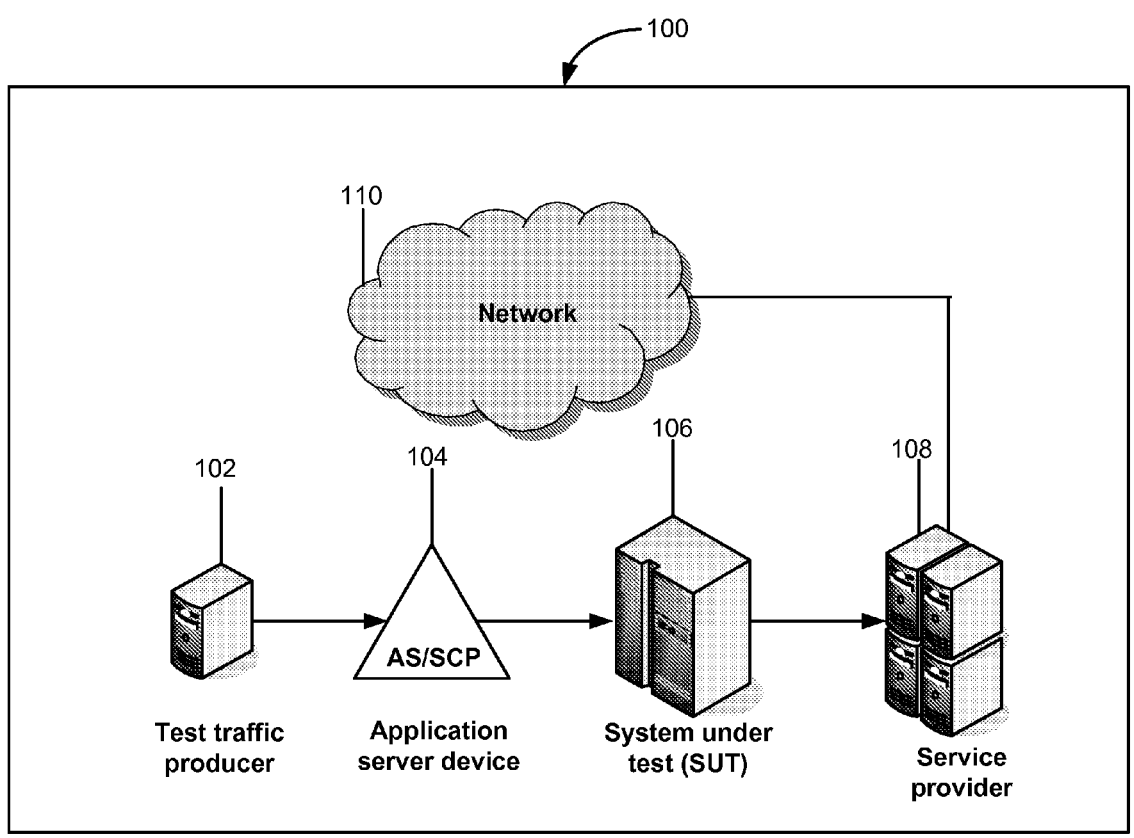
FIG. 1 shows a network in which exemplary systems and methods for controlling a test load throttle may be implemented.

FIG. 1 shows a network in which an exemplary system for controlling a test load throttle may be implemented. Network 100 may include test traffic producer 102, application server device 104, System Under Test (SUT) 106, service provider 108, and network 110. In practice, network 100 may include more or fewer traffic producers, application server devices, SUTs, and/or networks.

Test traffic producer 102 may include one or more computer systems for hosting applications and/or hardware components for generating network test traffic. For example, traffic producer 102 may generate Session Initiation Protocol (SIP) calls and/or Common Channel Signaling System Number 7 (SS7) calls. A "SIP call," as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.).

Application server device 104 may include one or more computer systems for hosting computer programs that include an application server. Examples of an application server include IBM WebSphere, BEA WebLogic, and JAIN Session Initiation Protocol (JSIP) Servlet. In a SIP setting, the hosted programs may facilitate SIP-based communications, e.g., Internet-based telephone calls, multimedia distribution, multimedia conferences, instant messaging conferences, interactive voice response (IVR), automated and manual operator services, automatic call distribution, call routing, etc.

SUT 106 may include one or more computer systems and/or network components for receiving network calls that originate from test traffic producer 102. SUT 106 may include monitors for detecting, recording, and/or trapping errors within SUT 106. For example, SUT may include a program that detects and records computer errors to a log file.

Service provider 108 may include one or more computer systems for receiving network calls that pass through SUT 106. Service provider 108 may be external or internal to a network that includes test traffic producer 102, application server 104, and SUT 106, and may deliver specific services, such as hosting live chat conferences.

Network 110 may include the Internet, an ad hoc network, a local area network (LAN), a wide area network (WAN), a metropolitan area network (MAN), a cellular network, a public switched telephone network (PSTN), any other network, or combinations of networks.

Figure 2:
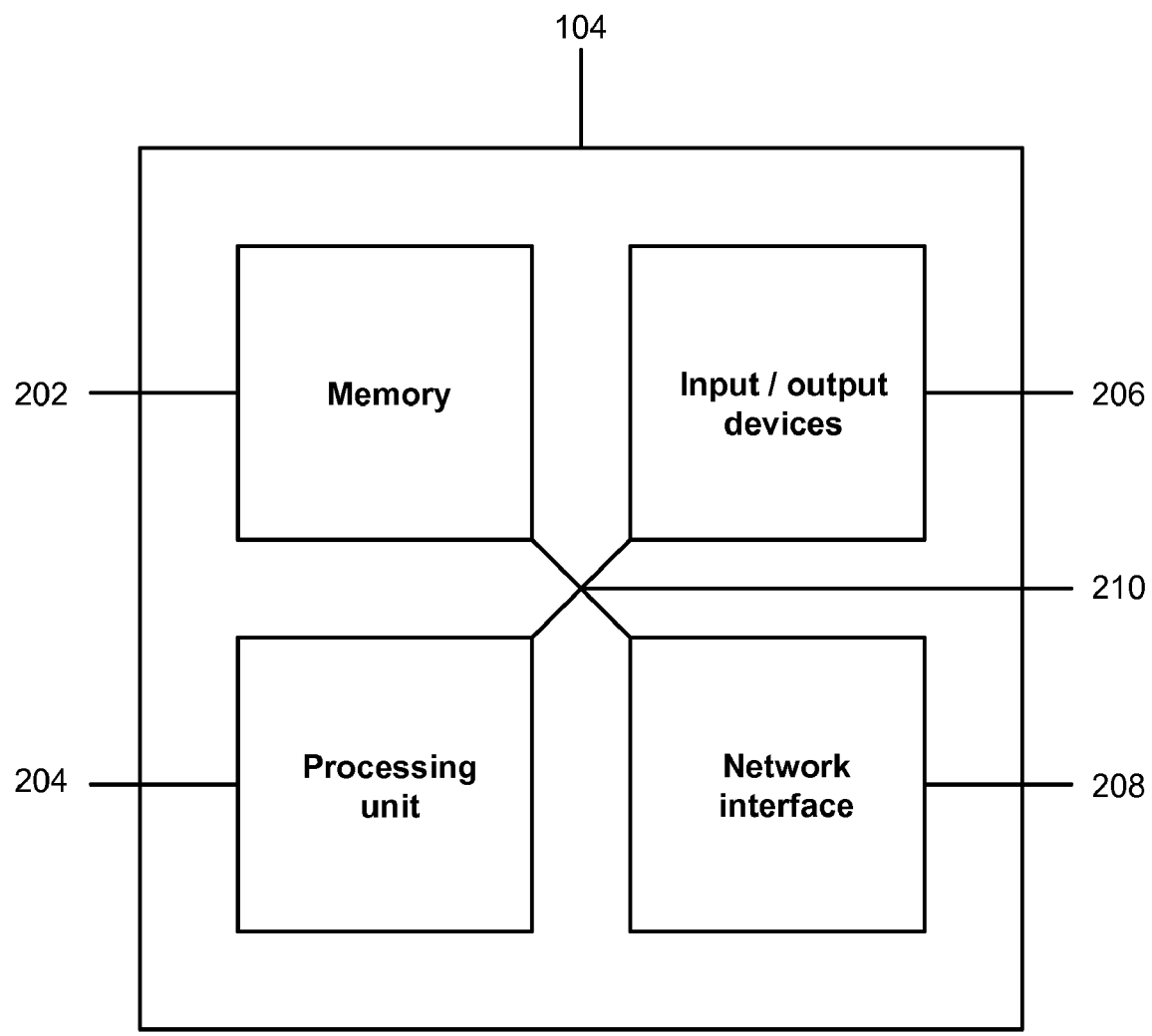
FIG. 2 is a block diagram of an exemplary computer system consistent with exemplary embodiments.

FIG. 2 illustrates an exemplary functional block diagram of a computer system 200. Test traffic producer 102, application server device 104, and/or SUT 106 may include one or more computer systems 200.

Computer system 200 may include memory 202, processing unit 204, input/output devices 206, network interface 208, and communications bus 210. Memory 202 may include static memory, such as read only memory (ROM), and/or dynamic memory, such as random access memory (RAM), for storing data and machine-readable instructions. Memory 202 may also include storage devices, such as a floppy disk, CD ROM, CD read/write (R/W) disc, and/or flash memory, as well as other types of storage devices. Processing unit 204 may include one or more processors, microprocessors, and/or processing logic capable of controlling computer system 200. Input/output devices 206 may include a display, printer, keyboard, mouse, speaker, microphone, and/or other types of devices for converting physical events or phenomena to and/or from digital signals that pertain to computer system 200. Network interface 208 may interface computer system 200 to network 100 and may include a modem, an Ethernet interface or any other type of network interface for communicating with other nodes of network 100. Communications bus 210 may provide an interface through which components of computer system 200 can communicate with one another.

Figure 3:
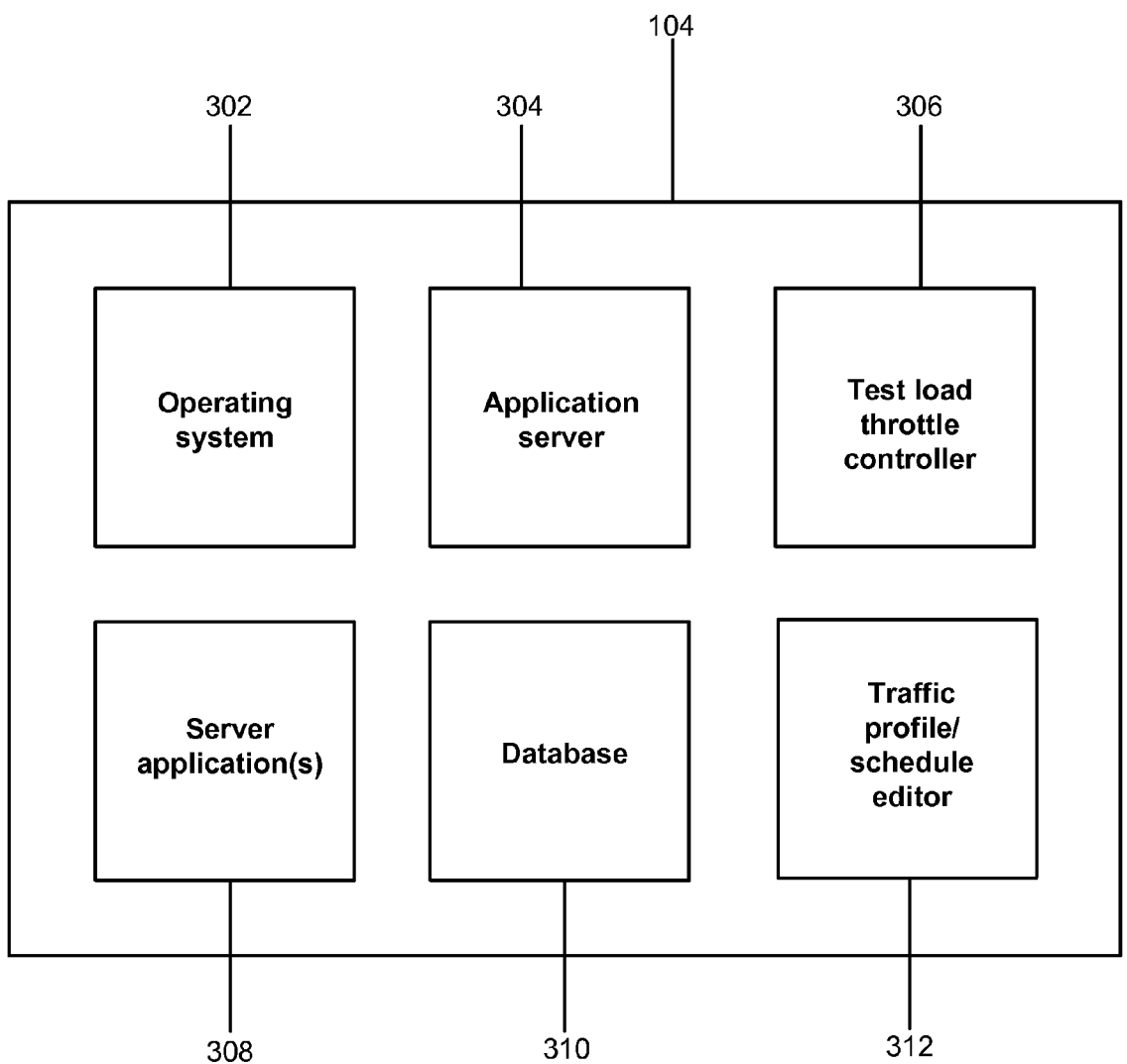
FIG. 3 shows exemplary software components present on an application server device consistent with exemplary embodiments.

FIG. 3 shows software components that may be present on an application server device 104. The software components may include operating system 302, application server 304, test load throttle controller 306, server application(s) 308, database 310, and traffic profile/schedule editor 312. Because application server device 104 may include one or more computer systems 200, the software components (i.e., operating system 302, application server 304, test load throttle controller 306, server application(s) 308, database 310, and traffic profile/schedule editor 312) may be distributed over many nodes in a local network or in a distributed network, for example, through virtual private network (VPN). In addition, there may be more than one copy of any of the software components. Furthermore, if the demands of the computing environment for application server device 104 are high, many of the software components or their subcomponents may be implemented in hardware to avoid service bottlenecks.

Operating system 302 may include a computer program for managing hardware and software resources of application server device 104. Application server 304 may include software components for providing middleware services between server resources and client applications. Examples of application server components include a JAIN SIP Servlet Container and an Enterprise JavaBeans Server. Test load throttle controller 306 may include software programs or components for throttling network calls that it receives in accordance with a profile of network traffic load.

Server application(s) 308 may include a browser and programs for rendering services that are not part of application server 304. Examples of server application(s) 308 include an FTP server, an email server, a telnet server, a fire wall, and other applications that either interact with client applications or operate in stand-alone mode.

Database 310 may include files and records and may act as an information repository for application server 304, test load throttle controller 306, server application(s) 308, and/or traffic profile/schedule editor 312. For example, application server 308 may obtain information from database 310 for rendering services to client applications and may place information received from client applications in database 310. In another example, test load throttle controller 306 may obtain profiles of test traffic loads or scheduled rates of calls from database 310.

Test profile/schedule editor 312 may include a computer program for creating and editing traffic load profiles/schedules in database 310. While test profile/schedule editor 312 is shown in FIG. 3 as being present on application server device 104, it may be hosted on other network devices (not shown) that have a remote network access to database 310 or may be dynamically downloaded to other network devices.

Figure 4A:
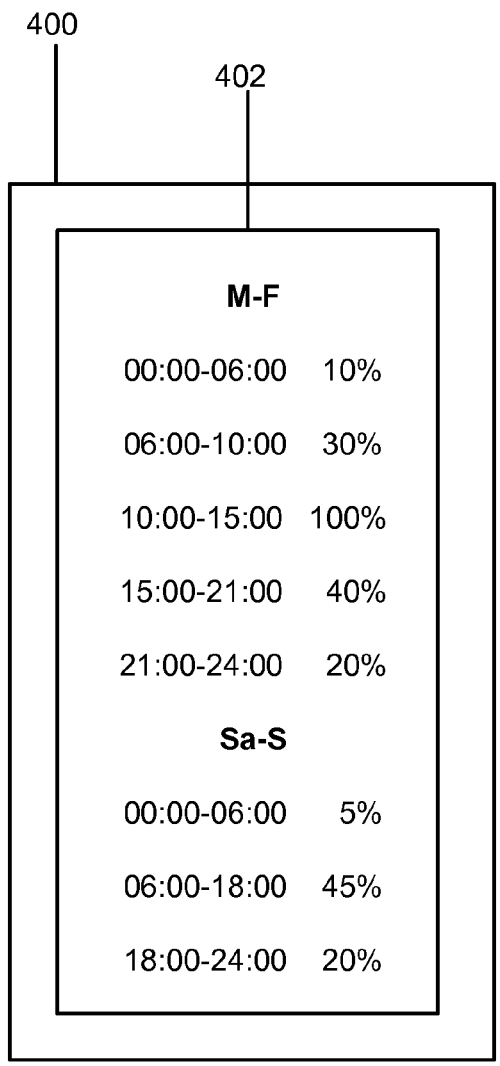
FIG. 4A illustrates a tabular representation of an exemplary profile/schedule of a test traffic load according to exemplary embodiments.

FIG. 4A illustrates a tabular representation of an exemplary profile/schedule 400 of a test traffic load in database 310. Test traffic load profile/schedule 400 may include table 402, which is based on Time of Day (TOD) and Day Of Week (DOW). Table 402 may include, for each of Monday through Friday, the percentage of the received traffic that may be relayed by test load throttle controller 306 for different hours of the day. Thus, for example, if test traffic load controller 306 were to receive 500 calls per second from test traffic producer 102 on Monday, 10% of the calls, at the rate of 50 calls per second, may be relayed between 12:00 A.M. and 6:00 A.M.

Figure 4B:
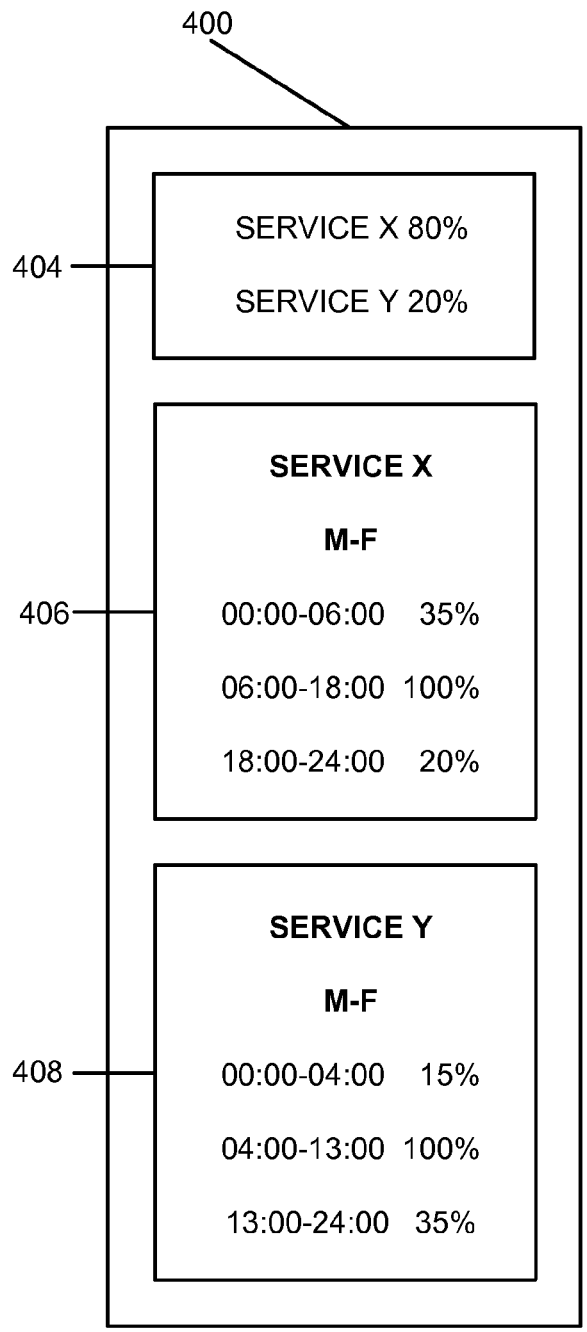
FIG. 4B illustrates tabular representations of another exemplary profile/schedule of a test traffic load according to exemplary embodiments.

FIG. 4B illustrates tabular representations of another exemplary profile/schedule 400 of a test traffic load in database 310. Test traffic load profile/schedule 400 may include tables 404, 406 and 408, which are based on service types and TOD/DOW. Table 404 may include the percentage of the received traffic that may be assigned by test load traffic controller 306 to different services. For instance, table 404 shows that 80% of the received calls may be assigned to service X, and 20% of the received calls to service Y. Tables 406 and 408 may include, for each service on each day of week, the percentage of the assigned traffic that may be relayed by test load traffic controller 306 for different hours of the day. For instance, table 406 shows, for Monday through Friday between 12:00 midnight and 6:00 a.m., 35% of the received calls that are assigned to service X may be relayed by test traffic controller 306.

While FIGS. 4A and 4B show profiles/schedules of test traffic load in database 310 as being partly based on TOD/DOW, in other implementations, profiles/schedules of test traffic load may be based on different schemes, as TOD and Day Of Month (DOM) and/or TOD and Day of Year (DOY). In addition, profiles/schedules may be based on timeline and/or number of calls that are to be routed.

Figure 5:
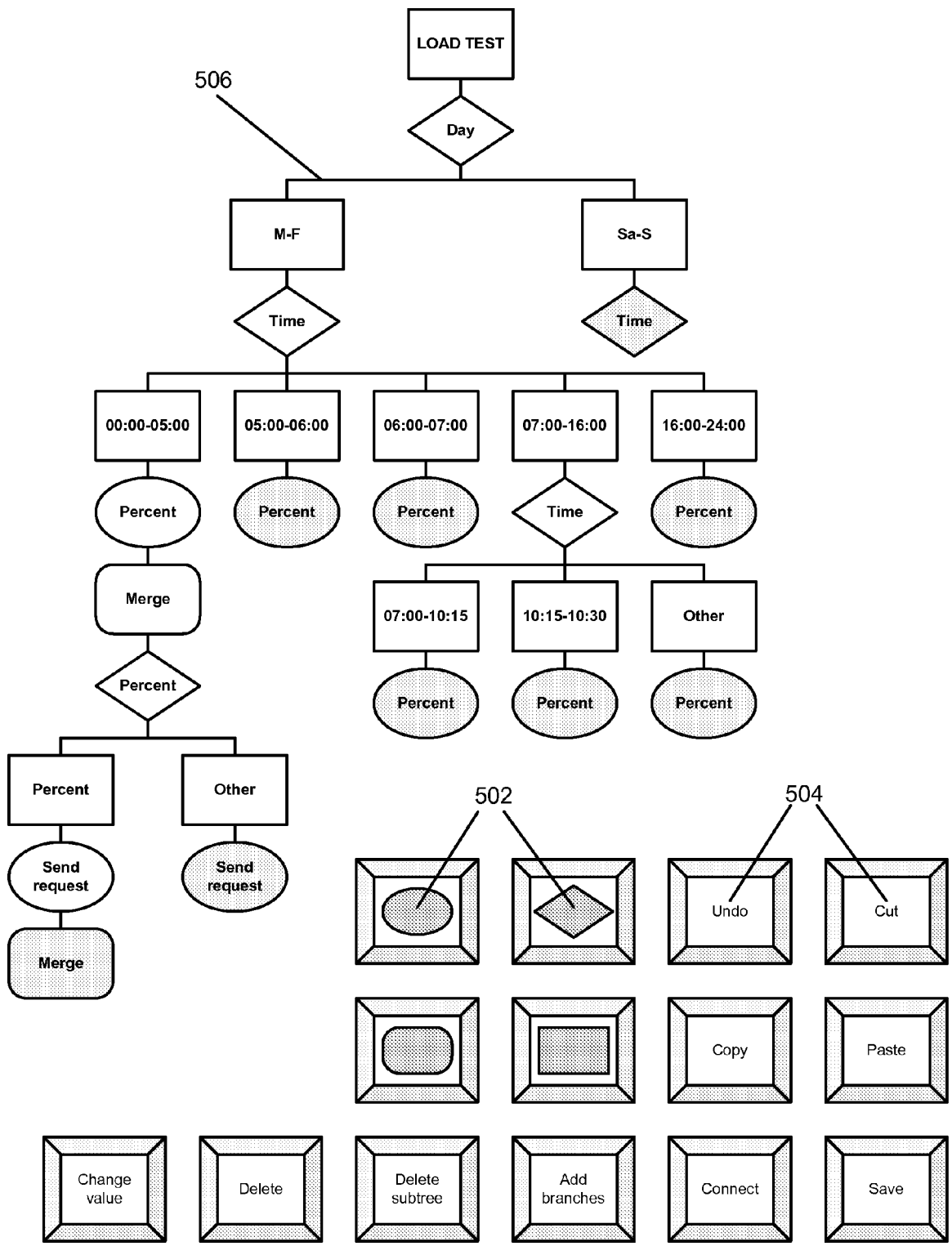
FIG. 5 is a block diagram of an exemplary graphical user interface (GUI) of a traffic profile/schedule editor.

Test traffic load profile/schedule 400 may be created or edited by a user, using traffic profile/schedule editor 312. FIG. 5 shows a functional block diagram of an exemplary graphical user interface (GUI) of a traffic profile/schedule editor 312. While FIG. 5 illustrates one type of GUI interface, it is possible to implement other types of interfaces that employ tables, timeline, or other suitable representations of schedules, services, and traffic load for editing and creating test traffic load profile/schedule 400.

In FIG. 5, traffic profile/schedule editor 312 may include menu/buttons 502 for specifying TOD, DOW, and traffic load levels (in percent) and menu/buttons 504 for editing. When the user saves schedule/profile 506, traffic profile/schedule editor 312 may insert data that represents schedule/profile 506 in database 310. Conversely, when the user loads existing schedule/profile 506 for editing purposes, the traffic profile/schedule editor 312 may read data that is associated with existing schedule/profile 506 from database 310.

The preceding paragraphs describe system elements that are related to controlling a test load throttle, such as test traffic producer 102, application server device 104, SUT 106, and service provider 108 and software applications and components that may be hosted on the elements. The following describes processes performed by the elements for controlling the test load throttle.

Figure 6:
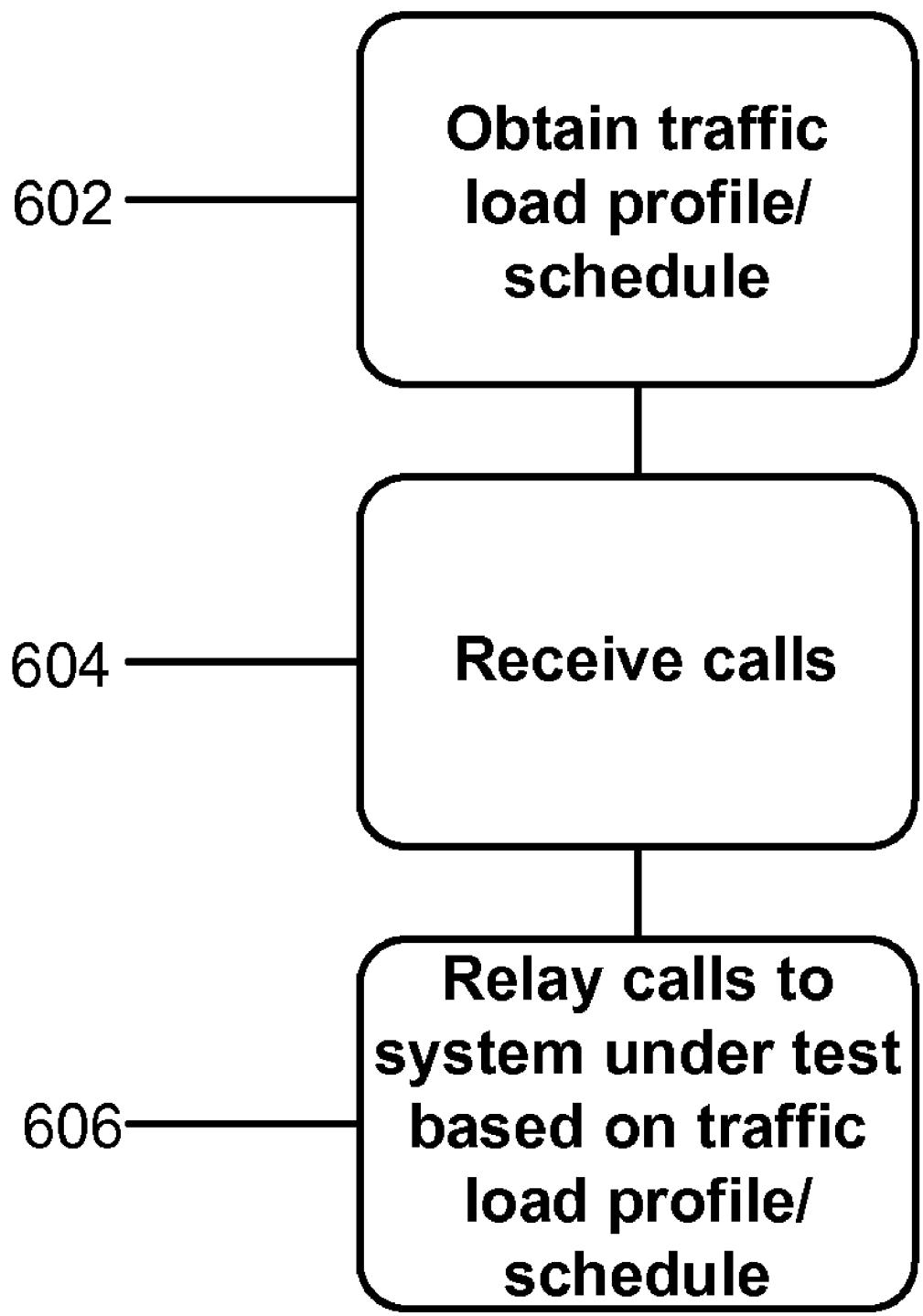
FIG. 6 is a flowchart of an exemplary process for controlling a test load throttle.

FIG. 6 illustrates a flowchart of an exemplary process for controlling a test load throttle. At block 602, profile/schedule 400 of test traffic loads may be accessed and loaded into test load throttle controller 306. Depending on implementation, test traffic load profile/schedule may be accessed and loaded while test load throttle controller 306 is performing its relaying and throttling of network calls. At block 604, calls (e.g., SIP calls) that are generated at test traffic producer 102 and routed through various network elements (not shown), such as gateways, switches, routers, bridges, and repeaters, may be received at test load throttle controller 306.

At block 606, the calls that are received at test load throttle controller 306 may be relayed to SUT 106. To vary a network load over an extended period of time based on TOD, DOW, DOM, and/or DOY, the calls are relayed based on schedules/profiles of test traffic loads from database 310.

Figure 7:
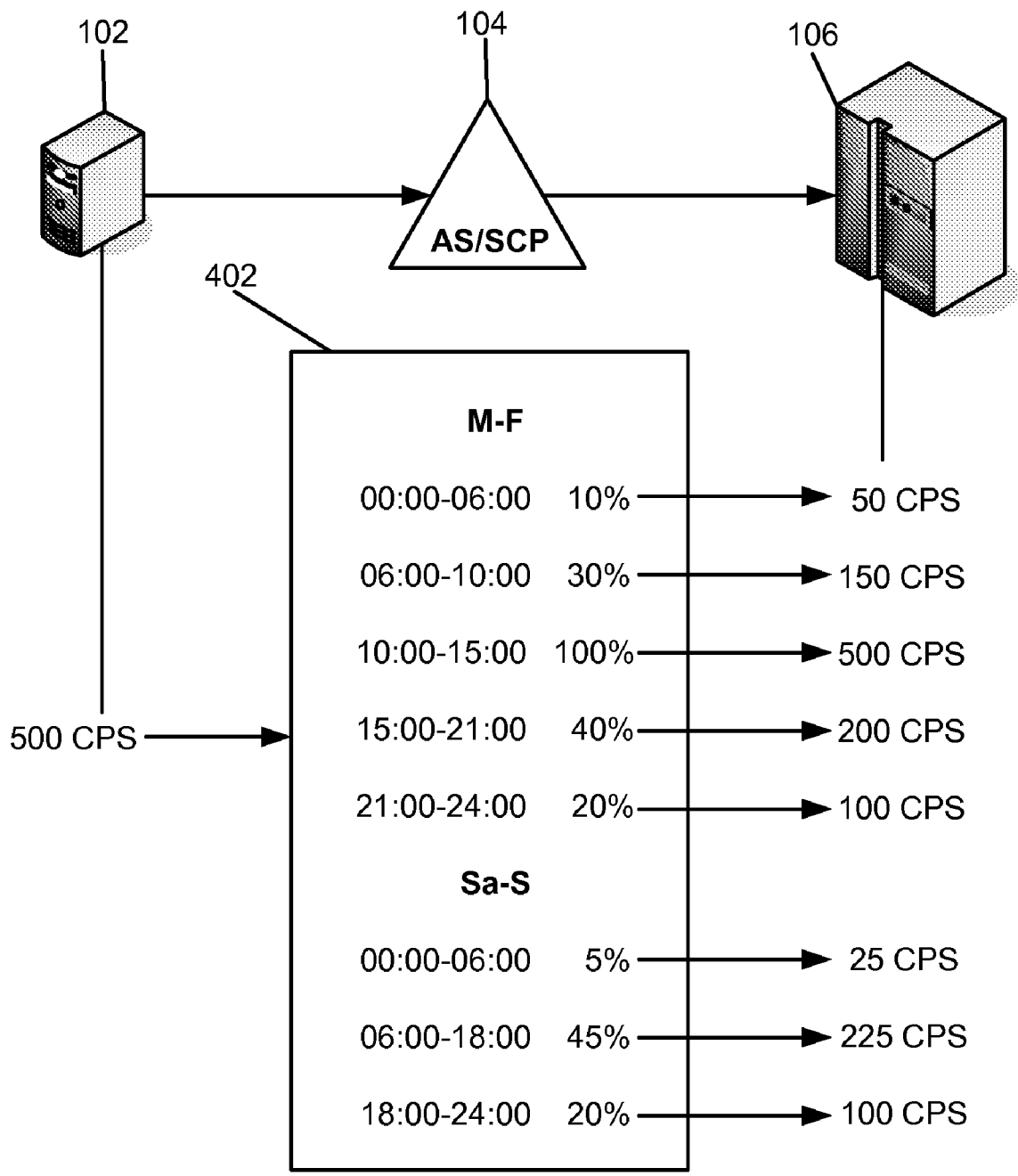
FIG. 7 is a block diagram of a traffic load producer, application server device, and system under test operating in accordance with a test load schedule/profile of FIG. 4A.

In one implementation, test load throttle controller 306 may control the flow of traffic to SUT 106 based TOD and DOW. For example, as illustrated in FIG. 7, test load throttle controller 306 may vary the number of calls it relays from test traffic producer 102 to SUT 106 based on table 402. For instance, between 12:00 midnight and 6:00 a.m. on Monday through Friday, test load throttle controller 306 may throttle the relayed traffic to 10% of the received calls, or equivalently, 500 CPS×0.10=50 CPS. In different implementations, test load throttle controller 306 may vary relayed network calls based on TOD/DOM, TOD/DOY, timeline, number of calls, and/or any other suitable test traffic load profile/schedule formats.

Figure 8:
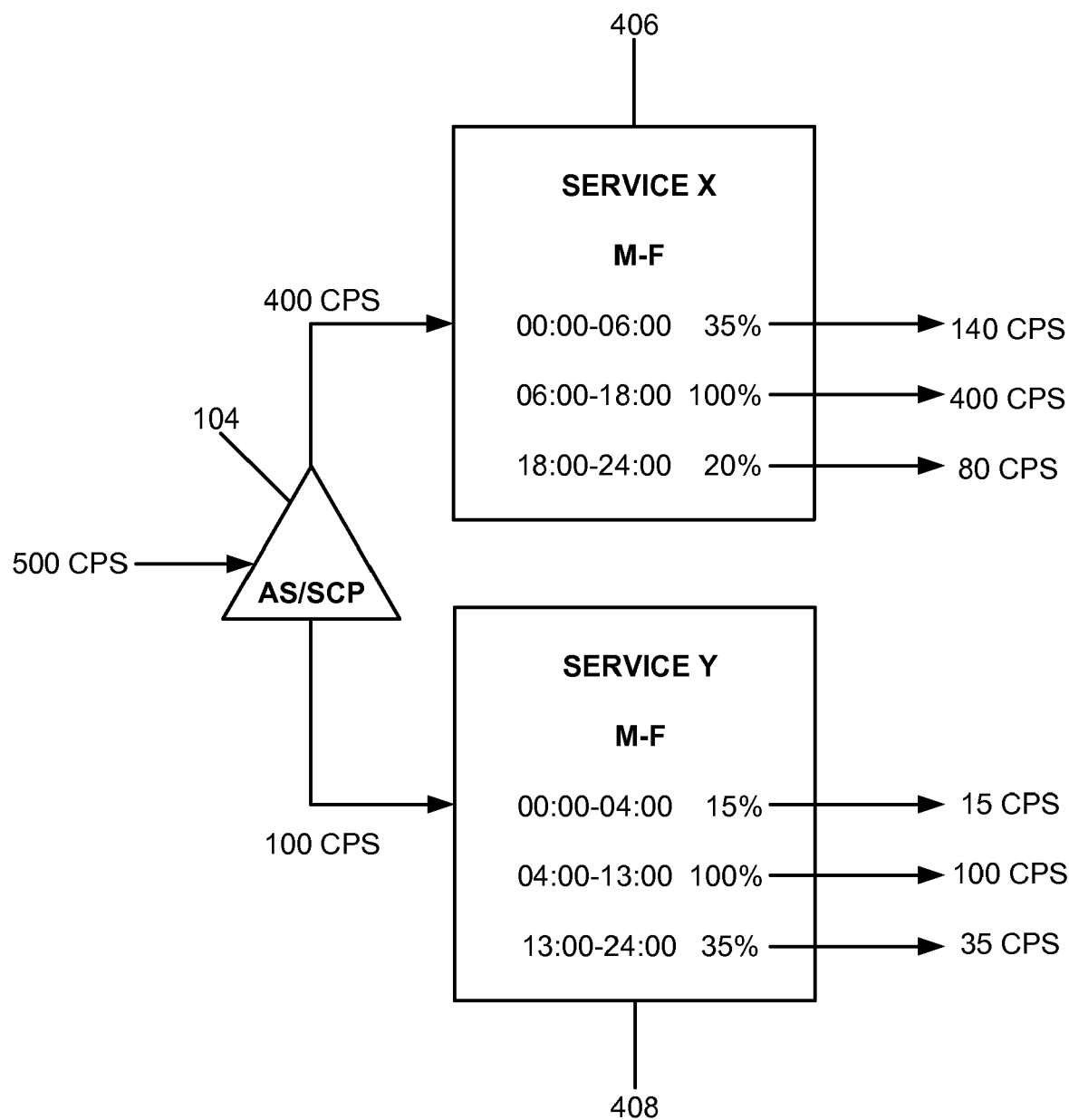
FIG. 8 is a block diagram of a traffic load producer, application server device, and system-under-test that are operating in accordance with a test load schedule/profile in FIG. 4B.

In another implementation, test load throttle controller 306 may control the flow of traffic to SUT 106 based on service type, as well as TOD/DOW. For example, as illustrated in FIG. 8, test load throttle controller 306 may control the flow of traffic based on service types as specified by table 404, as well as on TOD and DOW for each service type, as specified by tables 406 and 408. For instance, test load throttle controller 306 may assign 80% of the traffic (i.e., 400 CPS) to service X and 20% of the traffic (i.e., 100 CPS) to service Y. For service X, on Monday through Friday, between 12:00 midnight and 6:00 a.m., test load throttle controller 306 may throttle the traffic (400 CPS) to 35% of the assigned calls (i.e., 140 CPS). In different implementations, test load throttle controller 306 may vary relayed network calls based on service types, TOD/DOM, TOD/DOY, timeline, number of calls, and/or any other suitable test traffic load profile/schedule formats.

Figure 9A:
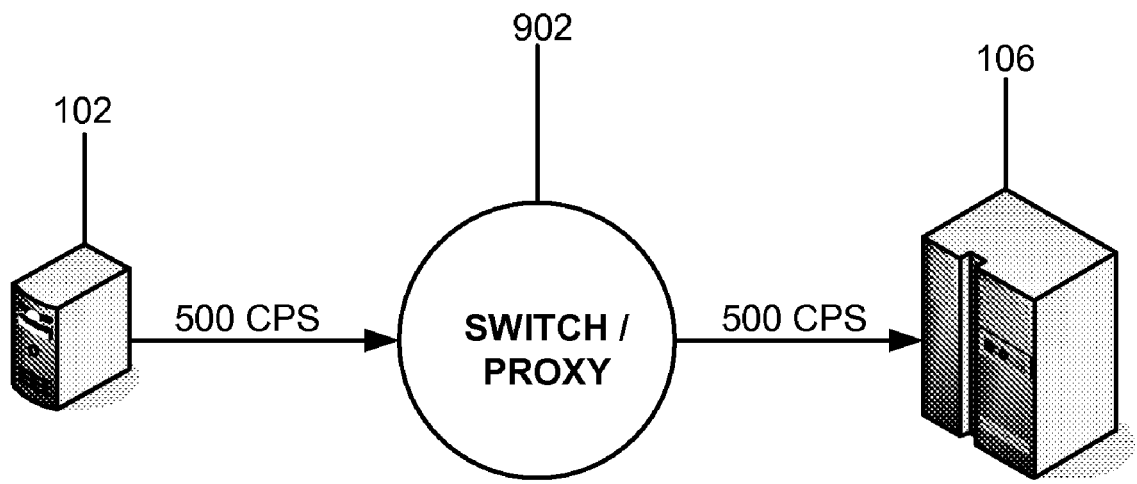
FIG. 9A illustrates a network configuration in which a traffic load producer makes service calls to a system-under-test through a switch or proxy.
Figure 9B:
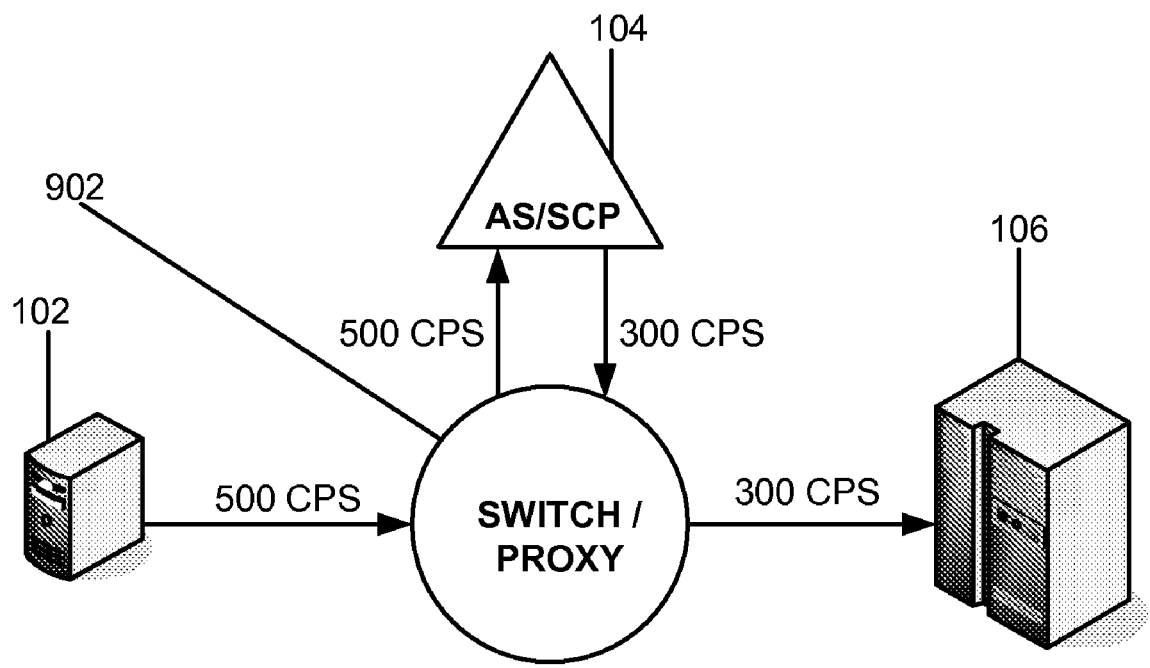
FIG. 9B illustrates the network configuration in FIG. 9A, with an application server device inserted in network call paths.

Many changes to the components and the process for controlling a test load throttle as described above may be implemented. In one implementation, test load throttle controller 306 may be configured so that it can be inserted into various call paths. For example, FIG. 9A shows a network configuration in which test traffic producer 102 generates calls to SUT 106 through a switch/proxy server 902. FIG. 9B shows the same network, but with application server device 104, and therefore, test load throttle controller 306, inserted into the call path. Test load throttle controller 306 may control the throttle of the calls that it receives in the same manner as described above.

In yet another implementation, test load throttle controller 306 may make either gradual or immediate changes to its rate of relayed calls in accordance with schedule/profile of traffic load in database 310, depending on test load throttle controller configuration. For example, in FIG. 7, on Monday between 12:00 midnight and 6:00 a.m., 10% of the received calls may be relayed to SUT 106. After 6:00 a.m., test load throttle controller 306 may gradually, rather than instantaneously, ramp up the percentage to 30%.

The following example illustrates processes that may be involved in controlling a test load throttle in accordance with implementations described with respect to FIGS. 1, 4, 6 and 7.

Assume, for the sake of the example, that a user wishes to test a protocol gateway under a production network traffic load for a year and that the user's network is configured for testing as illustrated in FIG. 1, with a load profile/schedule as shown in FIG. 4. In FIG. 1, the protocol gateway assumes the role of SUT 106. In the example, the protocol gateway logs all calls that it receives, has finite log file storage space, and does not rotate its log files.

Assume further that application server device 104, network 110, and service provider 108 are already in operation to support other tests and/or services in network 100. The user begins testing the protocol gateway, or SUT 106, by starting test traffic producer 102, the protocol gateway (SUT 106), and test load throttle controller 306. Test load throttle controller 306 loads traffic load profile/schedule 400 in FIG. 4.

For each day of week, test load throttle controller 306 uses traffic load profile/schedule 400 to route or relay test calls from test traffic producer 102. For instance, from 6:00 a.m. to 10:00 a.m., on Monday through Friday, test load throttle controller 306 relays only 30% of calls it receives from test traffic producer 102.

The protocol gateway receives the calls relayed from test load throttle controller 306 and routes them to service provider 108. In addition, the protocol gateway logs the calls in its log file.

Because the protocol gateway does not rotate its log files, the protocol gateway fills its storage space with logs of the calls. On the eleventh month of its operation, the protocol gateway fills up its file system and continuously writes file system error messages into its system logs. When the protocol gateway can no longer write error messages to system directories that are full, the protocol gateway locks up. The user examines the protocol gateway and isolates the problem.

The above example illustrates how a logging problem may be found by feeding the network with test traffic loads. By using the throttle controller that relays network calls to the SUT, it is possible to generate test loads that last for days, weeks, months, and/or years in accordance with desired test traffic profiles. Given the ability to generate test load profiles over prolonged periods of time, many problems may be determined, including those related to memory leaks, filling of file systems, and/or degradation of overall system performance when specific combinations of services are rendered to clients.

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIG. 6, the order of the blocks may be modified in other implementations. Further, non-dependent blocks may represent acts that can be performed in parallel.

It will be apparent that systems and methods described herein may be implemented in many different forms of software, firmware, and hardware in the implementations illustrated in the figures. The actual software code or specialized control hardware used to implement aspects does not limit the invention. Thus, the operation and behavior of the these systems and methods were described without reference to the specific software code - it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A device comprising:
a traffic load profile including information for regulating rates of routing calls; and
a controller to:
access the traffic load profile,
receive a number of network calls from a traffic load producer, the number of network calls being received during a particular time period,
determine, based on the traffic load profile, a percentage of the number of network calls to be routed to a system under test during the particular time period,
route only the determined percentage of the number of network calls, received from the traffic load producer during the particular time period, to the system under test, and
assign, based on the traffic load profile, a portion of the percentage of the number of received network calls to each service type, of a number of service types, associated with the system under test, the traffic load profile indicating, for each of the number of service types, percentages of the assigned portion of the percentage of the network calls to be routed by the controller at specific times during the particular time period, and
when routing only the determined percentage of the number of network calls, the controller routing the assigned portion of the number of received network calls to each service type, of the number of service types, associated with the system under test.

2. The device as in claim 1, where the number of network calls include Session Initiation Protocol (SIP) calls.

3. The device as in claim 1, where the number of network calls include Common Channel Signaling System Number 7 (SS7) calls.

4. The device as in claim 1, where the number of network calls are received from the traffic load producer, during the particular time period, at a constant rate.

5. The device as in claim 1, where the controller is further to:
receive, a second number of network calls from the traffic load producer during a second particular time period, the second particular time period occurring after the particular time period,
determine, based on the traffic load profile, a second percentage of the second number of received network calls to be routed to the system under test by the controller during the second time period,
determine, based on the traffic load profile, a second portion of the second percentage of the second number of received network calls that is assigned to each service type, of the number of service types, and
route, during the second particular time period, only the determined second percentage of the second number of network calls, received from the traffic load producer, to the system under test,
where, when routing only the determined second percentage of the second number of network calls, the controller is to route the assigned second portion of the second number of received network calls to each service type, of the number of service types.

6. The device as in claim 5, where the controller is further to:
determine, based on the traffic load profile and for each of the number of service types, a portion of the second number of the received network calls to be relayed to the system under test by the controller, to the corresponding service type, at specific times during the second particular time period.

7. A method comprising:
accessing, by a network device that controls network calls received by a network via a call path, a network traffic schedule;
receiving, by the network device, a number of network calls from a network call generator, via the call path, at a constant rate during a particular time period, the network call generator and the network device corresponding to different devices in the network;
determining, based on the network traffic schedule, a percentage of the number of network calls to be routed to a system under test during the particular time period;
routing only the determined percentage of the number of network calls, received from the network call generator during the particular time period, to the system under test;
assigning a portion of the percentage of the number of network calls to each service type, of a number of service types associated with the system under test, based on the network traffic schedule, the network traffic schedule indicating, for each of the number of service types, percentages of the assigned portion of the percentage of the network calls to be routed by the network device at specific times during the particular time period; and
when routing only the determined percentage of the number of network calls, the network device routing the assigned portion of the percentage of the number of network calls to each service type, of the number of service types, associated with the system under test.

8. The method as in claim 7, where routing the assigned portion of the number of network calls includes:
relaying, based on the network traffic schedule, a percentage of the number of network calls received from the network call generator to a node of the system under test over a particular amount of time during the period of time.

9. The method as in claim 8, where routing the assigned portion of the number of network calls, further includes:
identifying a second percentage of the number of network calls to be relayed from the network call generator to the node over a second amount of time, the second amount of time immediately following the particular amount of time during the period of time, and
incrementally changing the percentage of the number of network calls relayed from the network call generator to the node to gradually change the percentage of the number of network calls relayed from the call generator to the node to the second percentage of the number of network calls.

10. The method as in claim 8, where routing the assigned portion of the number of network calls, further includes:
identifying a second percentage of the number of network calls to be relayed from the network call generator to the node over a second amount of time, the second amount of time immediately following the particular amount of time during the period of time,
immediately changing the percentage of the number of network calls relayed from the network call generator to the node to the second percentage of the number of network calls at the end of the particular amount of time.

11. The method as in claim 7, where routing the assigned portion of the number of network calls, further includes:
routing different percentages of the number of network calls received from the network call generator to the node at specific times based on the network traffic schedule.

12. A system comprising:
a first network device to:
access a network load profile that includes, for each of a plurality of service types, information for regulating rates of routing calls received by the first network device,
receive a number of session initiation protocol (SIP) calls from a network node during a particular time period,
determine, based on the network load profile, a percentage of the number of SIP calls to be routed to a system under test during the particular time period,
route, based on the network load profile, only the determined percentage of the received number of SIP calls, received from the network node during the particular time period, to the system under test, and
assign a portion of the percentage of the number of SIP calls to each service type, of the plurality of service types, based on the network load profile, the network load profile indicating, for each of the plurality of service types, percentages of the assigned portion of the percentage of the SIP calls to be routed by the first network device at specific times during the particular time period, and
when routing only the determined percentage of the number of SIP calls, the first network device routing the assigned portion of the number of received SIP calls to each service type, of the number of service types, associated with the system under test.

13. The system as in claim 12, where the first network device is further to:
route the percentage of the number of SIP calls to the system under test through a proxy server.

14. The system as in claim 12, where the first network device is further to:
gradually change the percentage of the number of SIP calls routed to the system under test to a second percentage based on the network load profile.

15. The system as in claim 12, where the first network device is further to:
immediately change the percentage of the number of SIP calls routed to the system under test to a second percentage based on the network load profile.

16. The system as in claim 12, where the first network device is further to:
relay the percentage of the number of SIP calls from the network node to the system under test, at specific times associated with specific days of specific weeks, based on the network load profile.

17. The system as in claim 12, where the first network device is further to:
relay different percentages of the number of SIP calls from the network node to the system under test, at specific times associated with specific days of specific weeks, based on the network load profile.

18. The device of claim 1, where the controller receives the number of network calls from the traffic load producer via a network element associated with the system under test.

19. The device of claim 18, where the network element comprises one of a switch or a gateway.

* * * * *